UNITED STATES PATENT OFFICE.

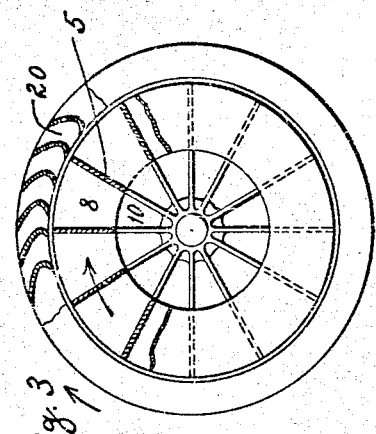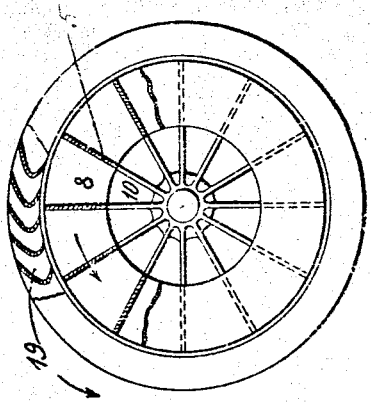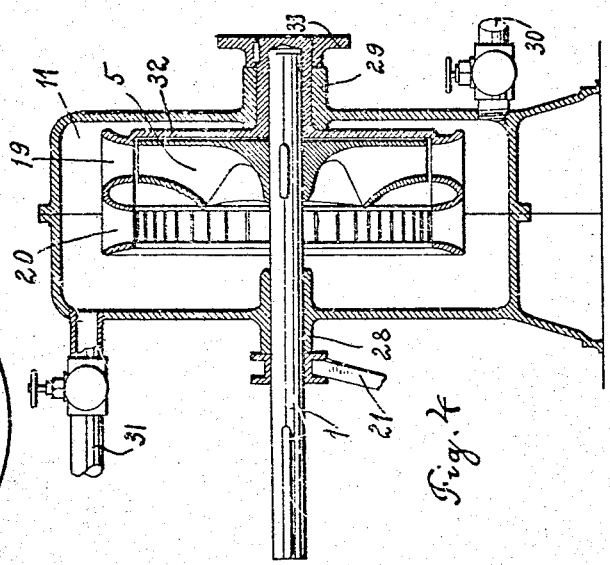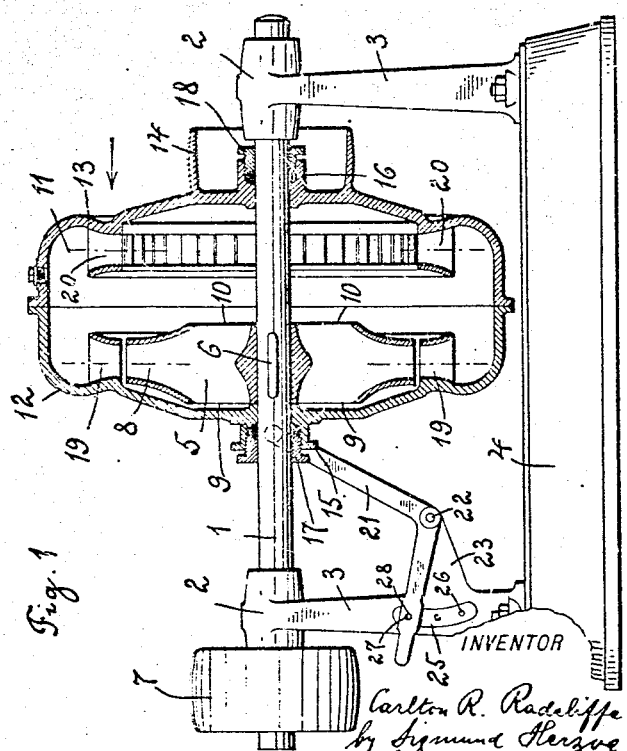

CARLTON R. RADCLIFFE, OF NEW YORK, N. Y., ASSIGNOR, BY MESNE ASSIGNMENTS, TO THE SCIENTIFIC RESEARCH CO., OF NEW YORK, N. Y., A CORPORATION OF NEW YORK.

HYDRAULIC POWER-TRANSMITTING APPARATUS.

984,849.

Specification of Letters Patent.  Patented Feb. 21, 1911.

Application filed July 8, 1907. Serial No. 382,677.

*To all whom it may concern:*

Be it known that I, CARLTON R. RADCLIFFE, citizen of the United States, and resident of the city of New York, in the county of New York and State of New York, have invented certain new and useful Improvements in Hydraulic Power-Transmitting Apparatus, of which the following is a specification.

The present invention relates to power transmitting apparatus, by means of which the rotation and power of the driving member is imparted to the driven member through the medium of a suitable fluid.

More particularly the device relates to hydraulic power transmitting apparatus having independently rotatable driving and driven members, and means whereby the direction of rotation of the driven member is reversed on reversing the direction of rotation of the driving member.

In power transmitting devices, as heretofore in use, the reversing of the direction of rotation of the driven member is accomplished by means of reversing gears, such as differential gears, planetary gears, etc., and it is obvious that the efficiency of the device is decreased by inserting a plurality of gears, necessary to reverse the direction of rotation of the driven member.

It is now the object of the present invention to provide a power transmitting apparatus in which the direction of rotation of the driven member may be reversed by reversing the direction of rotation of the driving member, but which device does away with the usual reversing gears, etc., and the efficiency of the device remains the same rotating in either direction.

The invention consists of an impeller of a centrifugal pump, secured to a shaft, and rotated by means of any suitable source of power. Upon the shaft is loosely mounted a closed casing, inclosing said impeller, and provided with two independent series of vanes, each of said series being similar to the vanes of an ordinary outflow reaction turbine. The casing is filled with a suitable fluid medium and, it will be seen that, in rotating the shaft and the impeller secured thereto a rotary motion is imparted to the fluid, which enters the vanes of the impeller, partakes of the rotation of the same and leaves the vanes with a considerable amount of kinetic energy, due to the velocity of whirl and radial velocity. The kinetic energy of the water is then used for doing useful work, *i. e.* to rotate the driven member.

As mentioned hereinbefore, two series of vanes are arranged on the driven member, and in such a way that the jets or streams flowing from the vanes of the impeller will impinge on one or on the other series of vanes and transmit rotation and power to the driven member. The first series is provided for the ahead direction and the second series for the reverse direction. It is obvious that the directions in which these two series of vanes discharge the fluid are opposite to each other, therefore their blades are bent in the opposite directions.

The invention is illustrated in the accompanying drawings, in which—

Figure 1 is a cross section of the apparatus parallel to the axis of the same, Figs. 2 and 3 are sections of the apparatus taken on lines at right angles to the longitudinal axis of the apparatus through the forward and reverse buckets, respectively, and Fig. 4 is a modification of the device.

1 indicates a shaft, journaled in bearings 2—2, carried by standards 3, secured to the base or frame 4.

An impeller 5, similar to the impeller of a centrifugal pump, is keyed by means of a key 6 to the shaft, or may be secured to the same in any other suitable manner. The shaft is rotated by any suitable source of power through a driving pulley 7. The impeller 5 is formed of a plurality of radial vanes 8, or of vanes like those of a reaction turbine-wheel. Each of the vanes 8 comprises two inlets 9 and 10, arranged on the opposite sides of the disk, forming the vanes of the impeller. A casing or shell 11 incloses this impeller and is loosely mounted upon the shaft 1. It comprises two parts 12 and 13, having flanges and secured together in a manner well known in the art. A pulley 14 is secured to or made integral with the part 13 of the casing, which pulley may be connected by means of a belt or other means to the device to be driven. The tubular portions 15 and 16 of the casing are provided with stuffing boxes 17 and 18 for obvious reasons. Two series of vanes 19 and 20 are secured to or made integral with the parts 12 and 13, respectively, of the casing 11 and do not differ in any essential way from the vanes of an outflow turbine.

As stated hereinbefore, the vanes 8 of the impeller 5 have two inlets 9 and 10. It will be observed, that in the position shown in Fig. 1 of the drawings, the inlets 10 of the vanes 8 are capable of admitting a fluid, while the inlets 9 of the vanes are closed by the walls of the part 12 of the casing. It is obvious that in bringing the vanes 8 in operative position to the vanes 20 of the casing, the inlets 9 will be opened and the inlets 10 closed. In order to bring the impeller in operative position to either of the series of vanes 19 and 20, a shifting lever 21 is provided and pivoted at 22 to a bracket 23, secured to the standard 3, and operatively connected to the casing 11. By means of this lever the casing and the vanes secured thereto may be longitudinally shifted relative to the impeller, so that the operator may at will direct the fluid, leaving the vanes of the impeller, to either of the series of the vanes 19 or 20.

The construction of the vanes of the impeller and of the casing is shown in details in Figs. 1, 2 and 3, in which, as will be seen, the blades of the vanes of the casing are bent in opposite directions, and will discharge, therefore, the fluid in opposite directions, reversing thereby the direction of rotation of the driven member when reversing the direction of rotation of the driving member and shifting the same from one series of vanes to the other one.

Power is applied to the shaft through the driving pulley 7 and rotates the impeller secured to the same. Considering the direction and position shown in Figs. 1 and 2, it will be seen that the liquid will enter the "eye" of the impeller through the inlet 10 and will rotate with the same. The centrifugal force forces the liquid toward the periphery of the impeller through the vanes 8, and imparts to the same a velocity of whirl, so that on leaving the vanes the liquid will possess a considerable amount of kinetic energy, due to its velocity of whirl and its radial velocity.

The liquid flows in jets or streams to the vanes 19 of the driven member, impinges on the same and imparts to the same rotation and energy. The liquid then leaves the vanes with a relative velocity which is practically zero and enters again the impeller to start again the circulation described hereinbefore.

It will be observed that the apparatus described acts like an outward flow reaction turbine, with the exception that the energy, operating the same, is created mechanically by the impeller; in other words it is a turbine having rotatable guides adapted to create "a head".

The fluid leaves the impeller practically tangentially and enters the vanes of the runner changing the direction of the flow as it leaves the same and exerts a pressure against the surfaces of the vanes in a direction shown by the arrow, moving thus the runner in this direction.

Referring now to Fig. 3, it is obvious that in reversing the direction of rotation of the impeller, i. e. the driving member, and shifting the case 11 so as to bring the vanes 20 in operative position relative to the impeller, the direction of action of the fluid will be reversed (relative to the direction described in connection with Fig. 2), and the runner will therefore reverse its direction of rotation. The arrow in Fig. 3 shows this action clearly.

It is a well known fact in the construction of turbines, that the torque of the driven member is a function of the difference of speeds of the guides and runner. In this particular case it is a function of the difference of the speeds of the impeller and runner. Since the speed of the impeller may be varied at will by varying the speed of the prime mover, driving the driving member, it will be seen that the torque of the apparatus may be varied in this way. Another way of varying the torque of the runner is to maintain the speed of the driving member and to vary the speed of the driven member. The speed of the driven member may be varied by shifting the lever 21, so that only a predetermined quantity of the water, leaving the vanes of the impeller, will enter the vanes of the runner, decreasing thereby the speed of the same. It is obvious that locking means may be provided for holding the lever and thereby the casing in an intermediate position. Such locking means are shown at 25 and consist of holes 26 in the standard 3 and a hole 27 in the lever 21 and a pin 28, which pin may be inserted in the hole 27 of the lever and, when the case is brought in an intermediate position, the pin is pushed into one of the holes 26 of the standard 3, holding thereby the casing against longitudinal movement. It will be noticed that the torque of the runner may also be varied automatically by the load applied to the runner. As the load increases, the speed of the driven member decreases and, since the torque increases as the difference of the speed of the driving member and driven member decreases, it will be seen that the torque increases as the load increases.

Fig. 4 is a modification of the device, in which the casing 11 is stationary and carries shaft 1 in the bearings 28 and 29. The casing is provided with an inlet 30 and an outlet 31 for running fluid, which, in being changed from time to time, will decrease the heat, which may be created by the rotation of the rotating member. The vanes 19 and 20 are arranged on a spider 32, loosely mounted upon the shaft 1 and adapted to rotate independently of the shaft. To the spider 32 is keyed a disk 35, so as to rotate therewith. To this disk may be secured a driven pulley or any other connection may be made through the same with the apparatus to be driven.

The operation of this device is practically the same than the operation hereinbefore described, with the exception that in this case the impeller is shifted relatively to the runner.

What I claim is:—

1. In a hydraulic power transmitting apparatus, the combination with a driving member provided with passages running in a direction which has a radial component, of a driven member, liquid means adapted to impart the rotation of said driving member to said driven member, means for reversing the direction of rotation of said driven member on reversing the direction of rotation of said driving member, and means adapted to vary the torque of said driven member when running in either direction.

2. In a hydraulic power transmitting apparatus, the combination with a driving member provided with passages running in a direction which has a radial component, of a driven member rotating independently of said driving member, liquid means adapted to impart the rotation of said driving member to said driven member, means for reversing the direction of rotation of said driven member on reversing the direction of rotation of said driving member, and means adapted to vary the speed of said driven member, when running in either direction.

3. In a hydraulic power transmitting apparatus, the combination with a driving member provided with passages running in a direction which has a radial component, of a driven member rotating independently of said driving member, means for reversing the direction of rotation of said driven member on reversing the direction of rotation of said driving member, and means adapted to vary the torque of said driven member on varying the speed thereof, when running in either direction.

4. In a hydraulic power transmitting apparatus, the combination with a rotatable driving member provided with passages running in a direction which has a radial component, of a rotatable driven member, a casing inclosing said members and containing a liquid, means for reversing the direction of rotation of said driven member on reversing the direction of rotation of said driving member, and means for controlling the flow of the liquid from said driving member to said driven member.

5. In a hydraulic power transmitting apparatus, the combination with a rotatable driving member provided with passages running in a direction which has a radial component, of a rotatable driven member, a casing inclosing said members and containing a liquid, means for reversing the direction of rotation of said driven member on reversing the direction of rotation of said driving member, and means for varying the speed of the driven member while maintaining the speed of the driving member.

6. In a hydraulic power transmitting apparatus, the combination with a driving member, of a driven member comprising two independent series of vanes, a casing containing a liquid and inclosing said members, and means suited to move said liquid in said driving member centrifugally and direct the same from said driving member to either series of vanes of said driven member in the plane of rotation of said rotating members, whereby the driven member may be rotated at will in either direction.

7. In a hydraulic power transmitting apparatus, the combination with a driving member, of a rotatable driven member comprising two independent series of vanes, a casing containing a liquid and inclosing said members, and a plurality of vanes on said driving member adapted to direct liquid to either series of vanes of said driven member, whereby the same may be rotated at will in either direction.

8. In a hydraulic power transmitting apparatus, the combination with a driving member, of a rotatable driven member, a casing containing a liquid and inclosing said members, a plurality of vanes on said driving member, two independent series of vanes on said driven member and arranged concentrically with the vanes of said driving member, the vanes of said driving member being adapted to direct liquid to either series of vanes of said driven member in the plane of rotation of said rotating members and rotate the same, at will, in either direction.

9. The combination with a rotatable driving member provided with passages running in a direction which has a radial component, of a rotatable driven member, a casing inclosing said members and containing a liquid adapted to transmit power from said driving member to said driven member, means for reversing the direction of rotation of said driven member on reversing the direction of rotation of said driving member, means for controlling the speed and torque of the driven member, and operating means for said speed-, torque-controlling- and reversing means.

10. In a hydraulic power transmitting apparatus, the combination with a centrifugal pump impeller, of a turbine-rotor comprising two independent series of vanes, and means for shifting one of said members to establish a continuous hydraulic circuit through said impeller and either series of vanes, at will.

11. In a hydraulic power transmitting apparatus, the combination with a primary turbine-wheel, of a secondary turbine-wheel comprising two independent series of vanes, a casing inclosing said wheels and containing a liquid, and means for shifting one of said wheels, whereby the passages of the primary wheel are brought to coincide with either series of passages of the secondary wheel, at will, to reverse the direction of rotation of the secondary wheel on reversing the direction of rotation of the primary wheel.

Signed at New York, in the county of New York and State of New York, this 6th day of July, A. D. 1907.

CARLTON R. RADCLIFFE.

Witnesses:
  S. BIRNBAUM,
  S. HERZOG.